(12) United States Patent
Yasuda

(10) Patent No.: US 10,661,704 B2
(45) Date of Patent: May 26, 2020

(54) VEHICLE LAMP AND CONTROL METHOD THEREOF

(71) Applicant: Koito Manufacturing Co., Ltd., Tokyo (JP)

(72) Inventor: Yuji Yasuda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 16/574,233

(22) Filed: Sep. 18, 2019

(65) Prior Publication Data

US 2020/0094730 A1 Mar. 26, 2020

(30) Foreign Application Priority Data

Sep. 21, 2018 (JP) .................. 2018-176859

(51) Int. Cl.
| | | |
|---|---|---|
| *B60Q 1/02* | (2006.01) | |
| *B60Q 1/14* | (2006.01) | |
| *F21S 41/151* | (2018.01) | |
| *H05B 45/10* | (2020.01) | |
| *H05B 45/37* | (2020.01) | |
| *F21S 41/663* | (2018.01) | |
| *B60Q 1/04* | (2006.01) | |
| *F21S 41/141* | (2018.01) | |

(52) U.S. Cl.
CPC .......... *B60Q 1/1423* (2013.01); *F21S 41/151* (2018.01); *H05B 45/10* (2020.01); *H05B 45/37* (2020.01); *B60Q 1/04* (2013.01); *F21S 41/141* (2018.01); *F21S 41/663* (2018.01)

(58) Field of Classification Search
CPC .......... F21S 41/141; F21S 41/663; B60Q 1/04
USPC ........................................... 315/82
See application file for complete search history.

(56) References Cited

U.S. PATENT DOCUMENTS

| | | | |
|---|---|---|---|
| 2009/0190324 A1* | 7/2009 | Watanabe | B60Q 1/085 362/40 |
| 2010/0060169 A1* | 3/2010 | Sugimoto | B60Q 1/1423 315/82 |
| 2011/0012510 A1* | 1/2011 | Tani | B60Q 1/1423 315/82 |
| 2016/0297351 A1* | 10/2016 | Ichikawa | H05B 45/10 |

FOREIGN PATENT DOCUMENTS

JP 2010-143447 A 7/2010

\* cited by examiner

*Primary Examiner* — Thuy V Tran
(74) *Attorney, Agent, or Firm* — Abelman, Frayne & Schwab

(57) ABSTRACT

A vehicle lamp includes: a low beam unit including a first light emitting unit and irradiating light only to region below a cutoff line; a high beam unit including a second light emitting unit and irradiating light to regions around and above the cutoff line; and a lighting controller that controls lighting of the low beam unit and the high beam unit. The lighting controller controls to switch between a low mode in which the low beam unit is turned ON and the high beam unit is turned OFF and a high mode in which the low beam unit and the high beam unit are turned ON, and a first light quantity irradiated by the low beam unit in the high mode is larger than a second light quantity irradiated by the low beam unit in the low mode.

9 Claims, 3 Drawing Sheets

FIG. 4

| LIGHTING MODE | FIRST EMBODIMENT | | | | SECOND EMBODIMENT | | | |
|---|---|---|---|---|---|---|---|---|
| | Lo MODE | | Hi MODE | | Lo MODE | | Hi MODE | |
| LIGHTING UNIT | Lo UNIT | | Lo UNIT | Hi UNIT | Lo UNIT | | Lo UNIT | Hi UNIT |
| LED BASE If typ(mA) | 700 | | 900 | | 700 | | 900 | |
| PWM DUTY | 90% | | 90% | 90% | 90% | | 90% | 90% |
| LIGHT SOURCE HOT LIGHT FLUX (lm) | 250 | | 300 | 300 | 250 | | 300 | 600 |

…

VEHICLE LAMP AND CONTROL METHOD THEREOF

CROSS-REFERENCE TO RELATED APPLICATIONS

This application is based on and claims priority from Japanese Patent Application No. 2018-176859, filed on Sep. 21, 2018, with the Japan Patent Office, the disclosure of which is incorporated herein in its entirety by reference.

TECHNICAL FIELD

The present disclosure relates to a vehicle lamp and a control method thereof, and particularly, to a vehicle lamp including a low beam unit and a high beam unit and a control method thereof.

BACKGROUND

A light emitting diode (LED) has been widely used as a light source of a vehicle lamp. By using the LED as a light source of a headlamp, it is possible to reduce the power consumption of the vehicle lamp compared to the cases where a halogen lamp or a high intensity discharge (HID) lamp is used. In addition, a headlamp using an LED for a light emitting unit, including a low beam unit that irradiates light to a lower side of a cutoff line and a high beam unit that irradiates light to an upper side of the cutoff line, is also proposed (see, e.g., Japanese Patent Laid-Open Publication No. 2010-143447 or the like).

In such a headlamp, when there are many opportunities to cross the oncoming vehicles, only the low beam unit is turned ON and light is not irradiated to the upper side of the cutoff line, thereby suppressing the disturbance of the driver of the oncoming vehicle (low mode). When there are less opportunities to cross the oncoming vehicles, the low beam unit and the high beam unit are simultaneously turned ON such that the light is irradiated further away to make it possible to favorably recognize a wide area (high mode).

SUMMARY

Generally, in actual vehicle driving, the low mode and the high mode are switched according to the driving environment. Therefore, the ratio of driving time in the low mode tends to be high in densely populated areas such as urban areas, and the ratio of driving time in the high mode tends to be high in expressways or mountain areas. In addition, as described above, although it is possible to reduce the power consumption of the headlamp by using the LED as the light emitting unit, there exists a demand for further reducing the power consumption and improving the distance visibility in the high mode during driving.

However, in a headlamp disclosed in Japanese Patent Laid-Open Publication No. 2010-143447, a low beam unit and a high beam unit are connected in series and turned ON by a common light source driving current IL. Therefore, the light source driving current IL flowing to the light emitting unit is equal in the low mode and the high mode, and thus, it is necessary to increase the light source driving current IL to increase the light quantity. Even with such a common light source driving current IL, it is possible to increase the light quantity in the high mode by increasing the number of LEDs used in the high beam unit. However, the number of LEDs is limited due to the relationship between the driving voltage and the forward voltage Vf, and thus, it has been difficult to realize an appropriate light quantity according to demand.

In addition, when the light source driving current IL is increased in order to increase the light quantity in the high mode, the light quantity of the low beam unit is also increased, not only the light quantity is insufficient in the irradiation range of the low beam unit in an urban area or the like, but also there has been room for improving the balance between the visibility and the power consumption.

Therefore, the present disclosure has been made in consideration of the problems in the related arts, and is to provide a vehicle lamp capable of suppressing the total power consumption while increasing light quantity in the high mode, and a control method thereof.

In order to solve the above problems, a vehicle lamp according to the present disclosure includes: a low beam unit including a first light emitting unit and configured to irradiate light only to a region below a cutoff line; a high beam unit including a second light emitting unit and configured to irradiate light to regions around and above the cutoff line; and a lighting controller that controls lighting of the low beam unit and the high beam unit. The lighting controller controls to switch between a low mode in which the low beam unit is turned ON and the high beam unit is turned OFF and a high mode in which the low beam unit and the high beam unit are turned ON, and a first light quantity irradiated by the low beam unit in the high mode is larger than a second light quantity irradiated by the low beam unit in the low mode.

As a result, it is possible to increase the light quantity in the high mode by increasing the first light quantity of the low beam unit, and to suppress the power consumption in the low mode by reducing the second light quantity of the low beam unit.

In addition, in an aspect of the present disclosure, a current supplied to the first light emitting unit in the high mode is larger than a current supplied to the first light emitting unit in the low mode.

In addition, in an aspect of the present disclosure, the first light emitting unit and the second light emitting unit are connected in series, and current values flowing to the first light emitting unit and the second light emitting unit in the high mode are equal.

In addition, in an aspect of the present disclosure, the lighting controller controls lighting of the first light emitting unit by a first pulse current of a pulse width modulation (PWM) control, and a duty ratio of the first pulse current is equal in the high mode and the low mode.

Further, the present disclosure provides a method of controlling a vehicle lamp including: a low beam unit including a first light emitting unit and configured to irradiate light only to a region below a cutoff line and a high beam unit including a second light emitting unit and configured to irradiate light to regions around and above the cutoff line. The method includes: turning ON the low beam unit and turning OFF the high beam unit in a low mode; and turning ON the low beam unit and the high beam unit in a high mode, in which a first light quantity irradiated by the low beam unit in the high mode is larger than a second light quantity irradiated by the low beam unit in the low mode.

The present disclosure may provide a vehicle lamp capable of suppressing the total power consumption while increasing light quantity in the high mode, and a control method thereof.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 is a table illustrating an example of the present disclosure.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

First Embodiment

Hereinafter, embodiments of the present disclosure will be described in detail with reference to the drawings. Identical or corresponding components, members, and processes in each of the drawings will be denoted by the same symbols, and overlapping descriptions thereof will be appropriately omitted.

Figure 1:
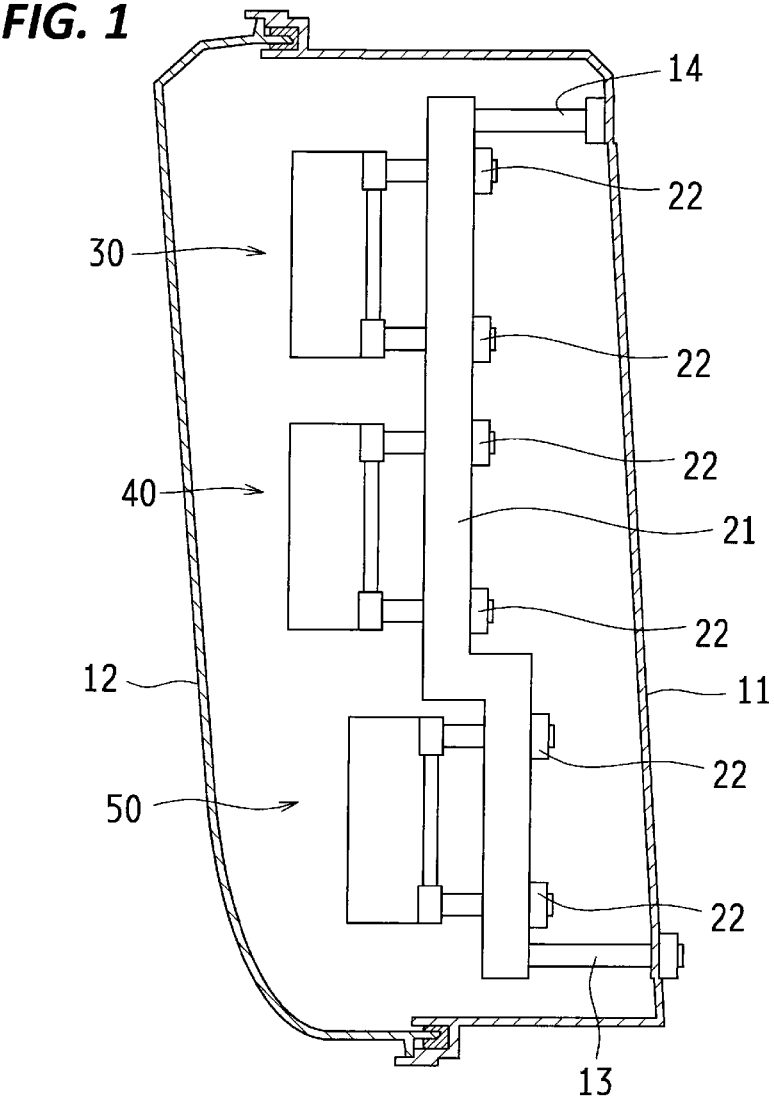
FIG. 1 is a schematic top view illustrating an example of a vehicle lamp 100 according to a first embodiment.

FIG. 1 is a schematic top view illustrating an example of a vehicle lamp 100 according to the present embodiment. The left in the drawing is the front of the vehicle lamp 100, and the right in the drawing is the rear. As illustrated in FIG. 1, the vehicle lamp 100 includes a lamp body 11 having an opening on the front side of the vehicle, and an outer lens 12 attached to cover the opening of the lamp body 11. The outer lens 12 is formed of a translucent resin, glass, or the like. In a lamp chamber formed by the lamp body 11 and the outer lens 12, a intermediate bracket 21 is held by an aiming screw 13 and an aiming pivot 14, and a high beam unit 30, a low beam unit 40, and a marker lamp unit 50 are held at the intermediate bracket 21 by unit aiming screws 22, respectively.

The intermediate bracket 21 is a plate-like member disposed with its main surface facing the front of the vehicle lamp 100, and includes a ball receiving portion and a screw hole at a predetermined position on the edge of the plate-like portion. The aiming screw 13 is inserted from the rear surface side of the lamp body 11 into the lamp chamber, and is screwed into the screw hole formed at one end of the intermediate bracket 21. The aiming pivot 14 is fixed on the rear surface of the lamp body at its one end, and a ball at the other end is rotatably engaged with the ball receiving portion.

The unit aiming screw 22 is inserted through the intermediate bracket 21 from the rear of the intermediate bracket 21, and is a member similar to a bolt screwed into the high beam unit 30, the low beam unit 40, and the marker lamp unit 50.

The high beam unit 30, the low beam unit 40, and the marker lamp unit 50 include an LED as a light emitting portion, and optical elements such as a reflector and a lens, and irradiate light forward from the outer lens 12 with a predetermined light quantity and light distribution pattern according to the supplied current and the control signal. The marker lamp unit 50 is a lamp unit configured to display any information or signals to the outside of the vehicle, and may be, for example, a positioning lamp, a daytime running lamp, or a side turn lamp.

Figure 2:
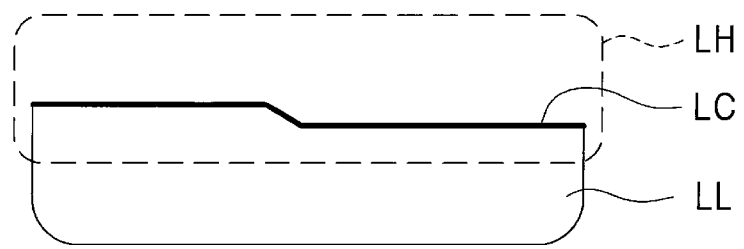
FIG. 2 is a schematic view illustrating a light distribution pattern of a high beam unit 30 and a low beam unit 40.

FIG. 2 is a schematic view illustrating a light distribution pattern of the high beam unit 30 and the low beam unit 40. In FIG. 2, a light distribution pattern LL of the low beam unit 40 is surrounded by a solid line, and a light distribution pattern LH of the high beam unit 30 is surrounded by a broken line. As illustrated in the drawing, the low beam unit 40 irradiates light only to a region below a cutoff line LC and the high beam unit 30 irradiates light to regions around and above the cutoff line LC.

Figure 3:
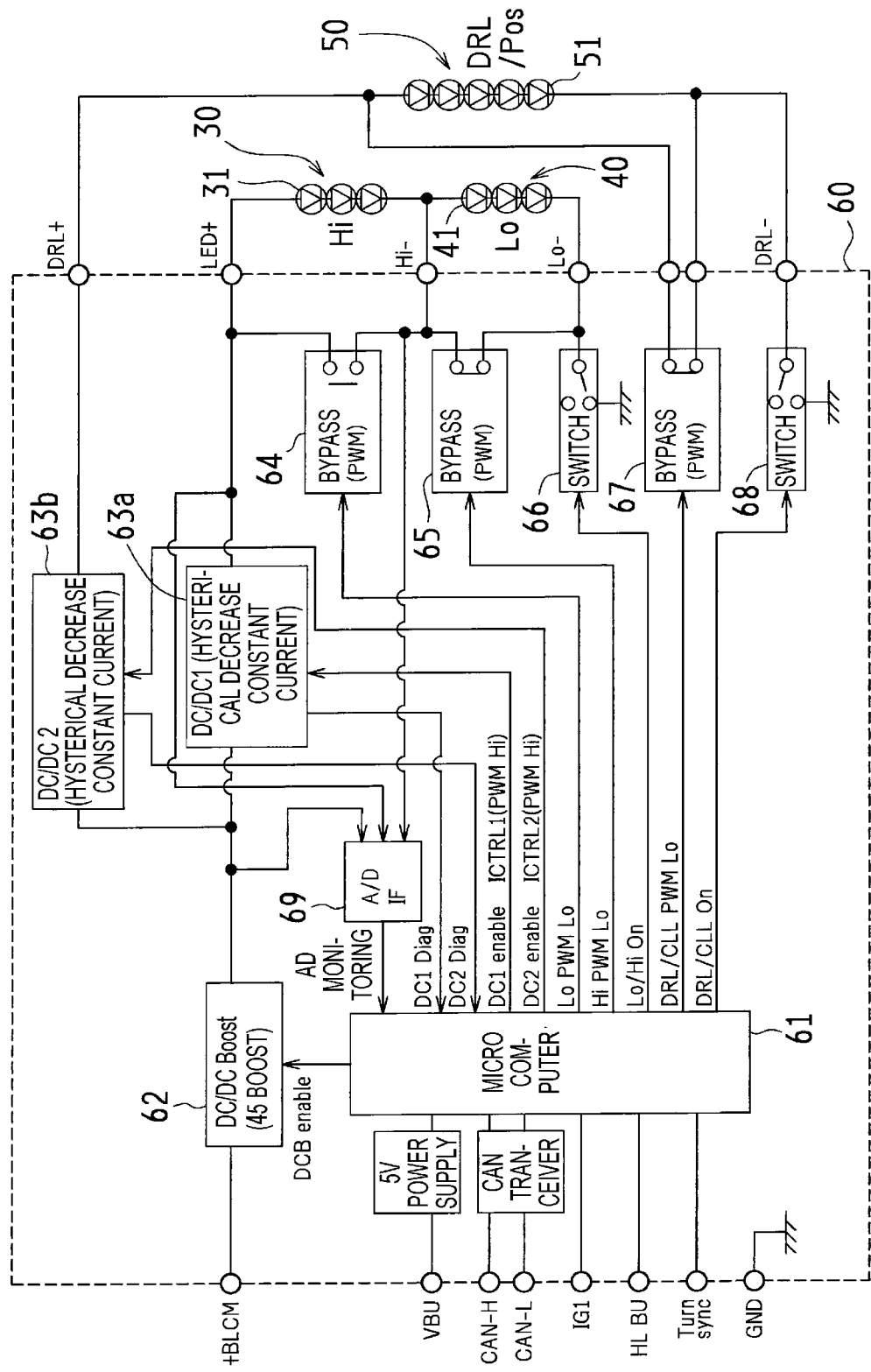
FIG. 3 is a circuit diagram illustrating an example of a driving circuit of the vehicle lamp 100 according to the first embodiment.

FIG. 3 is a circuit diagram illustrating an example of a driving circuit of the vehicle lamp 100 according to the present embodiment. As illustrated in FIG. 3, the vehicle lamp 100 includes a second light emitting unit 31, a first light emitting unit 41, a third light emitting unit 51, and a lighting controller 60. The second light emitting unit 31, the first light emitting unit 41, and the third light emitting unit 51 are included in the high beam unit 30, the low beam unit 40, and the marker lamp unit 50, respectively, and are configured by connecting a plurality of LEDs in series.

In addition, an anode of the second light emitting unit 31 is connected to an LED+ terminal of the lighting controller 60. A cathode of the second light emitting unit 31 and an anode of the first light emitting unit 41 are connected to a Hi− terminal of the lighting controller 60. A cathode of the first light emitting unit 41 is connected to a Lo− terminal of the lighting controller 60. An anode of the third light emitting unit 51 is connected to a DRL+ terminal of the lighting controller 60, and a cathode thereof is connected to a DRL− terminal of the lighting controller 60. As a result, the second light emitting unit 31 and the first light emitting unit 41 are connected in series, and the third light emitting unit 51 is connected in parallel to the second light emitting unit 31 and the first light emitting unit 41.

In FIG. 3, an example is illustrated in which the second light emitting unit 31 is constituted by three LEDs, the first light emitting unit 41 is constituted by three LEDs, and the third light emitting unit 51 is constituted by five LEDs. However, the number of LEDs that constitutes each light emitting unit is not limited. In addition, the types of LEDs included in the second light emitting unit 31, the first light emitting unit 41, and the third light emitting unit 51 may be the same, or may be different.

As illustrated in FIG. 3, the lighting controller 60 includes a calculation unit 61, a booster circuit unit 62, a first constant current circuit unit 63a, a second constant current circuit unit 63b, a first bypass circuit unit 64, a second bypass circuit unit 65, a first switch circuit unit 66, a third bypass circuit unit 67, a second switch circuit unit 68, and an AD monitoring unit 69.

The calculation unit 61 is an information processing unit that controls each unit such as the booster circuit unit 62, the first constant current circuit unit 63a, the second constant current circuit unit 63b, the first bypass circuit unit 64, the second bypass circuit unit 65, the first switch circuit unit 66, the third bypass circuit unit 67, and the second switch circuit unit 68, according to a program recorded in advance. The calculation unit 61 is driven by the power supplied from a power supply, and sends signals to respective units connected via wiring or the like to control the operations of the units.

The booster circuit unit 62 is connected to an external power supply, the calculation unit 61, the first constant current circuit unit 63a, and the second constant current circuit unit 63b, and, according to the control signal supplied from the calculation unit 61, boosts the voltage supplied from the power supply to output to the first constant current circuit unit 63a and the second constant current circuit unit 63b. As an example, the voltage supplied from the 12V power supply for vehicles is boosted to 45V to output to the first constant current circuit unit 63a and the second constant current circuit unit 63b.

The first constant current circuit unit 63a is connected to the calculation unit 61, the booster circuit unit 62, the first bypass circuit unit 64, and the LED+ terminal, and is a circuit that supplies a base current of the constant current from the voltage supplied from the booster circuit unit 62. In the first constant current circuit unit 63a of the present embodiment, the current value determined by the control signal supplied from the calculation unit 61 is output to the LED+ terminal, and the current value may be changed according to the control signal from the calculation unit 61.

The second constant current circuit unit 63b is connected to the calculation unit 61, the booster circuit unit 62, and the DRL+ terminal, and is a circuit that supplies the base current of the constant current from the voltage supplied from the booster circuit unit 62. In the second constant current circuit unit 63b of the present embodiment, the current value determined by the control signal supplied from the calculation unit 61 is output to the DRL+ terminal, and the current value may be changed according to the control signal from the calculation unit 61.

The first bypass circuit unit 64 is a circuit in which one end thereof is connected to the LED+ terminal and the other end thereof is connected to the Hi− terminal, and the opening and closing is controlled according to the control signal from the calculation unit 61. The second bypass circuit unit 65 is a circuit in which one end thereof is connected to the Hi− terminal and the other end thereof is connected to the Lo− terminal, and the opening and closing is controlled according to the control signal from the calculation unit 61. The third bypass circuit unit 67 is a circuit in which one end thereof is connected to the anode side of the third light emitting unit 51 via a terminal and the other end thereof is connected to the cathode side of the third light emitting unit 51 via a terminal, and the opening and closing is controlled according to the control signal from the calculation unit 61.

The first switch circuit unit 66 is a circuit in which one end thereof is connected to the Lo− terminal and the other end thereof is connected to the ground potential, and the opening and closing is controlled according to the control signal from the calculation unit 61. The first switch circuit unit 68 is a circuit in which one end thereof is connected to the DRL− terminal and the other end thereof is connected to the ground potential, and the opening and closing is controlled according to the control signal from the calculation unit 61.

The AD monitoring unit 69 is a circuit that monitors the output potential of the booster circuit unit 62, the output potential of the first constant current circuit unit 63a, the potential between the first bypass circuit unit 64 and the second bypass circuit unit 65, and transmits the information to the calculation unit 61. Although the wiring is omitted in the drawing, the AD monitoring unit 69 also monitors the output potential of the second constant circuit unit 63b. The calculation unit 61 receives the potential of each unit from the AD monitoring unit 69, performs feedback control, and controls respective units such as the booster circuit unit 62, the first constant current circuit unit 63a, the second constant current circuit unit 63b, the first bypass circuit unit 64, the second bypass circuit unit 65, the first switch circuit unit 66, the third bypass circuit unit 67, and the second switch circuit unit 68.

Next, the operation of the driving circuit illustrated in FIG. 3 will be described. When the headlamp is turned OFF, both the high beam unit 30 and the low beam unit 40 are turned OFF, and the calculation unit 61 controls the first switch circuit unit 66 to "open." The headlamp is turned ON, and in the case of the high mode or the low mode, the calculation unit 61 controls the first switch circuit unit 66 to "close."

When the marker lamp unit 50 is turned OFF, the calculation unit 61 controls the second switch circuit unit 68 to "open." When the marker lamp unit 50 is turned ON, the calculation unit 61 controls the second switch circuit unit 68 to "close," instructs to output the current value Id to the second constant current circuit unit 63b, sends a pulse width modulation (PWM) signal to the third bypass circuit unit 67, and controls the opening and closing in a pulse type. As a result, the light quantity of the marker lamp unit 50 is controlled by the PWM control with the base current Id, and is controlled independently of the high beam unit 30 and the low beam unit 40 to emit light.

When the headlamp is in the low mode, the calculation unit 61 instructs to output the current value Il to the first constant current circuit unit 63a, sends "close" signal to the first bypass circuit unit 64, sends the PWM signal to the second bypass circuit unit 65, and controls the opening and closing in the pulse type.

At this time, since the LED+ terminal and the Hi− terminal are conductive with each other in the state where the first bypass circuit unit 64 is in the closed state, no current flows in the second light emitting unit 31. In addition, since the second bypass circuit unit 65 is subjected to PWM control between the Hi− terminal and Lo− terminal, the current value Il flows to the first light emitting unit 41 during the period when the second bypass circuit unit 65 is "open." Since the second bypass circuit unit 65 is conductive while the second bypass circuit unit 65 is in the "close" state, no current flows in the first light emitting unit 41. Therefore, in the low mode, the second light emitting unit 31 of the high beam unit 30 is turned OFF, and the first light emitting unit 41 of the low beam unit 40 is turned ON by the PWM control.

When the headlamp is in the high mode, the calculation unit 61 instructs to output the current value Ih to the first constant current circuit unit 63a, sends the identical PWM signals to the first bypass circuit unit 64 and the second bypass circuit unit 65, and controls the opening and closing in the pulse type. At this time, the current value Il supplied to the first constant current circuit unit 63a is set to be larger than the current value Il supplied in the low mode. Therefore, for the light quantity emitted by the first light emitting unit 41, the first light quantity in the high mode becomes larger than the second light quantity in the low mode.

Since the current does not bypass between the LED+ terminal and Lo− terminal while the first bypass circuit unit 64 and the second bypass circuit unit 65 are "open," the current value Ih flows to the second light emitting unit 31 and the first light emitting unit 41. The current bypasses between the LED+ terminal and Lo− terminal while the first bypass circuit unit 64 and the second bypass circuit unit 65 are "close," so that the current does not flow to the second light emitting unit 31 and the first light emitting unit 41. Therefore, in the high mode, the second light emitting unit 31 of the high beam unit 30 and the first light emitting unit 41 of the low beam unit 40 are turned ON together by the PWM control. Since the second light emitting unit 31 and the first light emitting unit 41 are connected in series, the current flowing to both is equal at the current value Il.

In addition, in the PWM control of the first bypass circuit unit 64 and the second bypass circuit unit 65 by the calculation unit 61, the duty ratio in the low mode and the high mode may be equal. When the duty ratio is equal, the difference between the effective currents in the low mode and the high mode is determined only by the difference in the base current from the first constant current circuit unit 63a, and thus, the control method of the light quantity becomes easy. In addition, the duty ration of the PWM control may be 80% or more, and further, 90% or more. By controlling the duty ratio within this range, flicker can be suppressed.

As described above, in the vehicle lamp according to the embodiment, the lighting controller 60 turns ON the low beam unit 40 and turns OFF the high beam unit 30 in the low mode, and turns ON the low beam unit 40 and the high beam unit 30 in the high mode. In addition, the first light quantity emitted by the first light emitting unit 41 of the low beam unit 40 in the high mode becomes larger than the second light quantity emitted by the first light emitting unit 41 in the low mode.

As described above, in densely populated areas such as urban areas, the ratio of use in the low mode is high because there are many oncoming vehicles and pedestrians. Therefore, total power consumption may also be suppressed by reducing the power consumption in the low mode. In addition, since the ratio of use in the high mode is high in driving on expressways or mountains, the visibility of the surrounding area and the distance visibility may be improved by increasing the light quantity that irradiates the lower side of the cutoff line from the low beam unit 40, and also increasing the light quantity of the high beam unit 30.

Embodiment

FIG. 4 is a table illustrating an example of the present disclosure. In a first embodiment, six LEDs connected in series were used as the second light emitting unit 31, and three LEDs connected in series were used as the first light emitting unit 41. In a second embodiment, both the second light emitting unit 31 and the first light emitting unit 41 used the six LEDs connected in series. In addition, in both the first embodiment and the second embodiment, the output current from the first constant current circuit unit 63a was set to be Il=700 mA in the low mode, and Ih=900 mA in the high mode. The duty ratio of the PWM signal was set to 90% in both the low mode and the high mode in the first embodiment and the second embodiment.

In the first embodiment, the light irradiated by the low beam unit 40 was 250 lumen (lm) in the low mode, and 300 lumen (lm) in the high mode. The light irradiated by the high beam unit 30 in the high mode was 300 lumen (lm).

In the second embodiment, the light irradiated by the low beam unit 40 was 250 lumen (lm) in the low mode, and 300 lumen (lm) in the high mode. The light irradiated by the high beam unit 30 in the high mode was 600 lumen (lm).

As illustrated in FIG. 4, the light quantity of the light irradiated by the low beam unit 40 is increased by raising the base current supplied by the first constant circuit unit 63a in the low mode and the high mode from Il to Ih. As a result, it can be seen that improving the visibility by increasing the light quantity irradiated to the lower side of the cutoff line in the high mode are compatible with reducing the power consumption in the low mode. In addition, when the base current is not increased to Ih in the high mode, it is apparent that the light quantity irradiated from the high beam unit 30 is lower than that illustrated in FIG. 4, and the visibility of the distant area may be improved by increasing the light quantity from the high beam unit 30 in the high mode.

Second Embodiment

Next, the second embodiment of the present disclosure will be described. Descriptions of contents overlapped with the first embodiment will be omitted. Although the duty ratio of the PWM control in the high mode and the low mode was set to be equal in the first embodiment, the light quantity irradiated by the low beam unit 40 may be set to be larger in the high mode than in the low mode, by setting the duty ratio to be larger in the high mode than in the low mode.

In addition, although the example in which the second light emitting unit 31 and the first light emitting unit 41 are connected to one first constant current circuit unit 63a in series is illustrated in FIG. 3, two first constant circuit units 63a may be provided and the second light emitting unit 31 and the first light emitting unit 41 may be separately connected thereto to perform the PWM control individually. In addition, although the example in which the second light emitting unit 31 and the first light emitting unit 41 are subject to the PWM control by the calculation unit 61 is illustrated, the second light emitting unit 31 and the first light emitting unit 41 may be subject to DC driving using a continuous current instead of a pulse current.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
    a low beam light source including a first light emitter and configured to irradiate light only to a region below a cutoff line;
    a high beam light source including a second light emitter and configured to irradiate light to regions around and above the cutoff line; and
    a lighting controller that controls lighting of the low beam light source and the high beam light source,
    wherein the lighting controller controls to switch between a low mode in which the low beam light source is turned ON and the high beam light source is turned OFF and a high mode in which the low beam light source and the high beam light source are turned ON, and
    a first light quantity irradiated by the low beam light source in the high mode is larger than a second light quantity irradiated by the low beam light source in the low mode.

2. The vehicle lamp according to claim 1, wherein a current supplied to the first light emitter in the high mode is larger than a current supplied to the first light emitter in the low mode.

3. The vehicle lamp according to claim 2, wherein the first light emitter and the second light emitter are connected in series, and
current values flowing to the first light emitter and the second light emitter in the high mode are equal.

4. The vehicle lamp according to claim 3, wherein the lighting controller controls lighting of the first light emitter by a first pulse current of a pulse width modulation (PWM) control, and
a duty ratio of the first pulse current is equal in the high mode and in the low mode.

5. The vehicle lamp according to claim 2, wherein the lighting controller controls lighting of the first light emitter by a first pulse current of a pulse width modulation (PWM) control, and
a duty ratio of the first pulse current is equal in the high mode and in the low mode.

6. The vehicle lamp according to claim 1, wherein the first light emitter and the second light emitter are connected in series, and
current values flowing to the first light emitter and the second light emitter in the high mode are equal.

7. The vehicle lamp according to claim 6, wherein the lighting controller controls lighting of the first light emitter by a first pulse current of a pulse width modulation (PWM) control, and
a duty ratio of the first pulse current is equal in the high mode and in the low mode.

8. The vehicle lamp according to claim 1, wherein the lighting controller controls lighting of the first light emitter by a first pulse current of a pulse width modulation (PWM) control, and
a duty ratio of the first pulse current is equal in the high mode and in the low mode.

9. A method of controlling a vehicle lamp including a low beam light source including a first light emitter and configured to irradiate light only to a region below a cutoff line and a high beam light source including a second light emitter and configured to irradiate light to regions around and above the cutoff line, the method comprising:
turning ON the low beam light source and turning OFF the high beam light source in a low mode, and
turning ON the low beam light source and the high beam light source in a high mode,
wherein a first light quantity irradiated by the low beam light source in the high mode is larger than a second light quantity irradiated by the low beam light source in the low mode.

* * * * *